United States Patent
Vegh et al.

(10) Patent No.: US 6,692,151 B2
(45) Date of Patent: Feb. 17, 2004

(54) LINEAR MOTION GUIDE WITH A POSITIVELY GUIDED CAGE FOR ROLLING ELEMENTS

(75) Inventors: Peter Vegh, Aesch (CH); Samuel Wirth, Allschwil (CH); Ernst Mischler, Roggwil (CH); Hans Egger, Sins (CH)

(73) Assignee: Schneeberger Holding AG, Roggwil (CH)

( * ) Notice: Subject to any disclaimer, the term of this patent is extended or adjusted under 35 U.S.C. 154(b) by 23 days.

(21) Appl. No.: 10/078,546

(22) Filed: Feb. 21, 2002

(65) Prior Publication Data

US 2002/0114546 A1 Aug. 22, 2002

(30) Foreign Application Priority Data

Feb. 22, 2001 (CH) ................................. 0314/01
Jun. 13, 2001 (CH) ................................. 1063/01

(51) Int. Cl.[7] .............................................. F16C 29/04
(52) U.S. Cl. ............................. 384/51; 384/49; 384/57
(58) Field of Search ............................. 384/51, 57, 50, 384/49, 47, 22, 18

(56) References Cited

U.S. PATENT DOCUMENTS

| | | | | |
|---|---|---|---|---|
| 1,201,791 A | * | 10/1916 | Anderson | 384/49 |
| 2,294,665 A | * | 9/1942 | Jackson | 384/47 |
| 2,607,636 A | * | 8/1952 | Michelsen | 384/49 |
| 3,024,073 A | * | 3/1962 | Krueger | 384/49 |
| 3,857,618 A | | 12/1974 | Hagen et al. | |
| 3,975,063 A | * | 8/1976 | Mahotka et al. | 384/18 |
| 4,262,974 A | | 4/1981 | Tojo et al. | |
| 4,524,671 A | | 6/1985 | Bender et al. | |
| 4,929,097 A | * | 5/1990 | Mottate | 384/49 |
| 5,076,715 A | | 12/1991 | Saoyama et al. | 384/49 |
| RE34,981 E | * | 6/1995 | Mottate | 384/47 |
| 5,427,454 A | | 6/1995 | Tsuboi | 384/47 |
| 5,685,646 A | * | 11/1997 | Gilbert | 384/49 |

FOREIGN PATENT DOCUMENTS

GB 892596 3/1962

* cited by examiner

Primary Examiner—Thomas R. Hannon
(74) Attorney, Agent, or Firm—Venable LLP; Ralph P. Albrecht; Stuart I. Smith (57) ABSTRACT

A linear motion guide for mounting and longitudinally guiding machine parts, in which a first guide element provided to be fixed to a machine part is guided by a plurality of rolling elements along a longitudinal movement axis with respect to a second guide element, likewise provided to be fixed to a machine part, for this purpose each guide element has a groove-like recess running parallel to the longitudinal movement axis, boundary surfaces of the recess in each guide element are provided as rolling surfaces for the rolling elements, the rolling elements are arranged one after another in one or more rows in at least one cage between the two guide elements, the cage is provided with at least one first positive guide, the cage with its first positive guide being guided by second positive guide fixed to the guide elements, each second positive guide being arranged only on one of the guide elements and being fixed in position relative to the latter. In order to provide this type of linear motion guide with accurate guidance and favourable fabrication and assembly properties, it is proposed that the second positive guide is fixed to the respective guide element (1, 2) outside the groove-like recesses (4, 5) and project between the two guide elements in order to guide the first positive guide and here are operatively connected to the first positive guide.

16 Claims, 5 Drawing Sheets

LINEAR MOTION GUIDE WITH A POSITIVELY GUIDED CAGE FOR ROLLING ELEMENTS

BACKGROUND OF THE INVENTION

The invention relates to a linear motion guide for mounting and longitudinally guiding machine parts, in which a first guide element provided to be fixed to a machine part is guided by a plurality of rolling elements along a longitudinal movement axis with respect to a second guide element, likewise provided to be fixed to a machine part, for this purpose each guide element has a groove-like recess running parallel to the longitudinal movement axis, boundary surfaces of the recess in each guide element are provided as rolling surfaces for the rolling elements, the rolling elements are arranged one after another in one or more rows in at least one cage between the two guide elements, the cage is provided with at least one first positive guide means, the cage with its first positive guide means being guided by second positive guide means fixed to the guide elements, each second positive guide means being arranged only on one of the guide elements and being fixed in position relative to the latter.

Linear motion guides of the generic type thus have at least one row of rolling elements, which roll in the grooves, always in a rectilinear movement. As distinct from recirculating linear motion guides, in the case of generic linear motion guides the rolling elements do not leave their rectilinear movement path, in which they are in contact with both guide elements in a load-bearing function. Linear motion guides of the above-described type are usually provided in order to permit relative movements of machine components.

In order that the rolling elements are always arranged at predetermined distances from one another, it has been known for a long time to arrange the rolling elements in a cage, as it is known. In a cage, a dedicated mount is provided for each rolling element, in which the rolling element can move in rotation. The linearly moving guide element produces a rotational movement in the rolling elements, from which a linear movement of the rolling elements also results, by means of which in turn the cage is carried along in a linear movement.

Intrinsically, the position of the cage and of the rolling elements with respect to the two guide elements is always predetermined. However, because of external influences, displacement of rolling elements with respect to their predetermined intended position may result. This can lead to a displacement of the cage, which in turn results in a change in the displacement range in which the two guide elements, or the machine components connected to the latter, can be displaced with respect to one another. In order to avoid such a movement, normally referred to as "cage wandering", there already exist various forms of positive guides for the cage.

For example, in a first previously disclosed positive guide, provision is made to connect a cage to a pinion. The pinion is located outside the two grooves, beside the two guide elements. The pinion engages in two racks, which are each fixed to one of the two machine parts which are intended to execute the relative movements. The unsatisfactory aspect of this solution is that, because of the required fixing of the racks to the machine parts, the manufacturer of the linear motion guide cannot supply the latter in preadjusted form. The racks have to be fitted by the machine manufacturer himself, and the individual guide components have to be toleranced relatively closely in order that the toothing system can function.

The same problem arises in the solution shown in U.S. Pat. No. 4,524,671. In this document, a linear guide based on rolling-contact bearings for a gun barrel with respect to a guide sleeve is shown. To this end, so-called strips are formed on the gun barrel and bearing rails are formed on the guide sleeve. The rolling elements are arranged in a cage in a spacing area between a strip and a bearing rail in each case. Furthermore, in order to guide the gun positively, in each case a rack, in which a pinion arranged on the cage engages, is fixed to the strip and the bearing rails. Both the pinion and the racks are located outside the spacing area provided for the rolling elements for one of the strips with respect to one of the bearing rails.

In another solution, previously disclosed, inter alia, by U.S. Pat. No. 5,427,454, in each case a rack is introduced into both guide elements, in the bottom of their grooves. A pinion connected to the cage is positively guided by both racks. In this case, it can be felt to be disadvantageous that the guide elements necessitate high fabrication expenditure, because of the racks to be introduced. In addition, the assembly of the guide proves to be difficult, since the position of the cage can no longer be changed as soon as the pinion engages in the racks. A further difficulty consists in the mutual alignment of the two racks arranged in the grooves, so that both racks engage correctly in the pinion. In addition, there is the risk of damaging teeth during assembly.

Finally, a further guide has been disclosed in which a cage belonging to the rolling elements is positively guided. Here, in each case a deflection roller is fitted at the two ends of the cage, in which roller a thin rope or a string is guided in each case. The ends of the two ropes are in each case fixed to the ends of the guide elements. This solution also entails complicated assembly. In addition, the required thin strings and the small deflection rollers are susceptible to defects. It has also been shown that, on account of external influences, such as temperature changes, length changes of the strings can occur. The length changes lead to play of the cage or even to distortions of the cage between the two strings. If the cage is guided by resilient spring elements instead of by strings, as shown in U.S. Pat. No. 4,262,974, then exact positive guidance can barely be achieved.

SUMMARY OF THE INVENTION

The invention is therefore based on the object of providing a linear motion guide which, with the most accurate guidance possible of the cage, exhibits favourable fabrication and assembly properties.

In the case of a device of the type mentioned at the beginning, this object is achieved, according to the invention, by the second positive guide means being fixed to the respective guide element outside the groove-like recesses, projecting between the two guide elements in order to guide the first positive guide means and here being operatively connected to the first positive guide means.

In a linear motion guide according to the invention, all the positive guide means can already be brought by the manufacturer into serviceable operative connection with one another, since all the positive guide means are fitted to the linear motion guide itself. This also results in no further components of the linear motion guide having to be fitted to the machine parts, apart from the guide elements themselves. Since the second positive guide means are fixed to external surfaces, such as side surfaces, of the guide elements, which side surfaces are easily accessible, preferably even in the assembled state of the linear motion guide, linear motion guides according to the invention are also comparatively simple to assemble. Of course, it would also be possible to fit each of the second positive guide means to an outer surface, located outside the groove, of one of the guide elements, the said surface lying opposite an outer surface of the other guide element in the assembled state of the linear motion guide. Expressed in other words, the second positive guide means could also be fixed to surfaces of the guide elements which bound a gap between the two guide elements.

An additional advantage is that, in order to form a linear motion guide according to the invention, use can be made of conventional guide elements which are relatively simple to fabricate. These guide elements merely have to be modified to the effect that fixing the second positive guide means to them is possible.

In the case of linear guides according to the invention, the second positive guide means should be fixed to their guide element in a fixed location, that is to say substantially immovably in relation to the second positive guide means. Immovable components can be assembled with comparatively little effort and are in addition little susceptible to defects in operation.

In the case of linear guides according to the invention, the positive guide means of the guide elements can preferably be intrinsically rigid, in order also to be able to absorb or to transmit loadings other than only pure tensile loadings, as is the case in the ropes previously known. The property "intrinsically rigid" is therefore to be understood as the opposite of the flexible ropes. In order to avoid damage to the positive guide means, it may be advantageous if these have a certain elasticity, in spite of their rigidity, in order to be able to absorb loadings by means of reversible deformation. As a result of the elasticity, premature fracture of the component can be avoided. The positive guide means can therefore advantageously be configured from an appropriate metallic material or from plastic.

In preferred embodiments according to the invention, the second positive guide means of the linear motion guides can each have an operative connecting part, which is operatively connected to the first positive guide means, the operative connecting part arranged in a fixed location on the guide element having a longitudinal extent which runs parallel to the longitudinal movement axis.

In this case, a maximum length of the two operative connecting parts in the displacement direction can correspond approximately to half, or slightly more than half, of the maximum displacement travel along which the two guide elements can be displaced in relation to each other. In the case of linear guides of the generic type based on rolling-contact elements, the cage always covers half the displacement travel executed by the two guide elements as a relative movement in relation to each other. If the length of the operative connecting parts is chosen to be slightly greater than half the displacement travel, a secure operative connection between the positive guide means can be ensured even at the end of the displacement travel.

In a preferred embodiment, the first positive guide means is a pinion fixed to the cage such that it can rotate about an axis of rotation. The pinion is preferably located in the centre of the cage. In particular when high forces act on the cage, a plurality of pinions can also be provided. If the positive guidance is based on the engagement of toothing systems, then the second guide means may be two racks, of which in each case one is fitted to one of the guide elements. This embodiment offers the advantage of high functional reliability of positive guides based on pinion/racks, without entailing the disadvantage of difficult assembly or of damaging teeth during the assembly.

In this case, it is further preferred for the racks to be designed as an angled profile in relation to a cross section, it being possible for the said profile to have a fixing leg and a toothed leg angled with respect thereto. The fixing leg is advantageously fitted to a freely accessible side surface of the corresponding guide element, running parallel to the longitudinal movement axis. The toothed leg provided as operative connecting part of the second positive guide means can engage in a gap between the two guide elements and can be operatively connected there to the second positive guide means.

If the racks on outer surfaces of the guide elements are in each case fitted to different sides of the two guide elements, then the two guide elements, including the fixing means required on the guide elements, can be configured to be completely structurally identical. This reduces the outlay on fabrication.

Although a positive guide based on tooth engagements is preferred according to the invention, instead of this, however, other form-fitting or else force-fitting positive guides can also be provided, such as positive guides using magnetic or inductive forces.

Further preferred refinements of the invention emerge from the claims and the drawing.

BRIEF DESCRIPTION OF THE DRAWINGS

The invention will be explained in more detail using an exemplary embodiment illustrated purely schematically in the figures, in which.

DETAILED DESCRIPTION OF THE INVENTION

Figure 1:
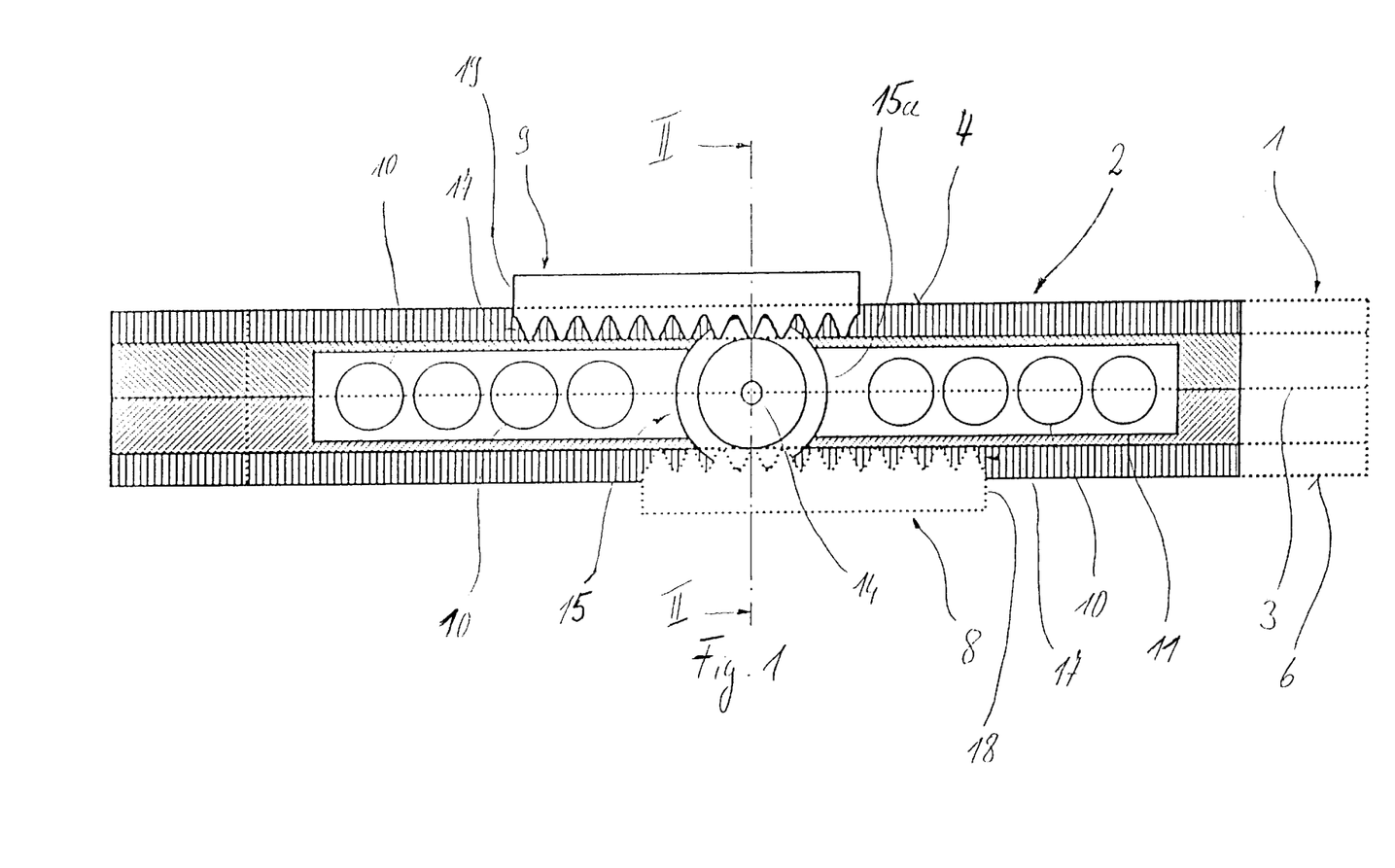
FIG. 1 shows a sectional illustration of an embodiment according to the invention based on balls as rolling-contact elements.
Figure 2:
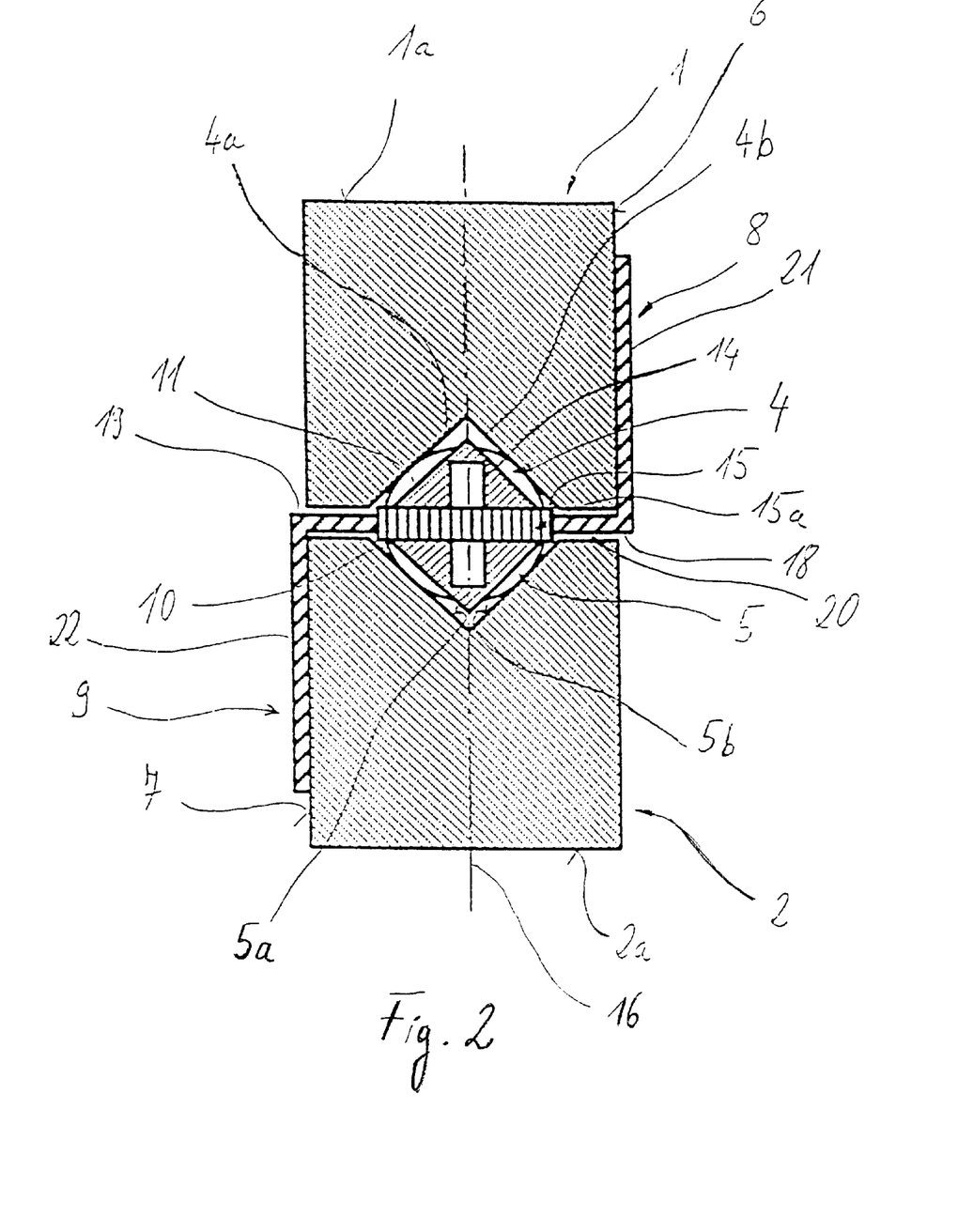
FIG. 2 shows a sectional illustration of the linear guide of FIG. 1 along the line II—II.

FIGS. 1 and 2 show a linear motion guide according to the invention, which has two guide elements 1, 2 designed as profile strips. The direction of the longitudinal extent of the two guide elements 1, 2 corresponds to a longitudinal movement axis 3, along which a relative movement between the two guide elements is possible. A single V-shaped groove 4, 5 is made in each of the guide elements 1, 2, which have a rectangular cross section. The two grooves 4, 5 lie with their open sides opposite and, in cross section, are designed as equilateral triangles with an opening angle of 90° in each case. Boundary surfaces 4a, 4b, 5a, 5b of the two grooves 4, 5 function as rolling surfaces for rolling elements. The grooves 4, 5 each extend over the entire length of their guide elements 1, 2. As will be explained in more detail below, a structural unit, which has a cage and rolling elements arranged therein and a first positive guide means designed as a pinion, is located in the grooves 4, 5. By means of this structural unit, relative movements between the two guide elements are possible. The structural unit will be described in more detail below.

In each case on an outside side surface 6, 7 of each guide element, running parallel to the longitudinal movement axis, a second positive guide means in the form of a rack 8, 9 is fixed by means of a plurality of screws, not shown. Of course, other types of fixing, such as snap-in connections, are also possible. The racks 8, 9, just like the pinion, are made of a metallic material or plastic and, on the basis of an appropriate material selection and adequate dimensioning, are designed to be intrinsically rigid. As can be seen in both figures, the racks 8, 9 are fixed to the guide elements 1, 2 on respectively different sides of the linear motion guide. A maximum length in the displacement direction of the two racks corresponds to about half, or slightly more than half, of the maximum displacement travel along which the two guide elements can be displaced with respect to each other.

In the embodiment shown in the figures, the rolling elements are designed as balls 10. All the balls 10 are arranged one behind another in only one row at right angles to the plane of the drawing of FIG. 2. The balls 10 rest on the two rolling surfaces 4a, 4b; 5a, 5b of each groove 4, 5 and transmit the load from the machine part (not shown) connected to the moveable guide element 1 to the fixed-position guide element 2, for example connected to a machine frame. In each case successive balls 10 are arranged at the same distance from one another in holders in the cage 11. In this case, the balls 10 are located with little play in their holders, so that they can rotate freely in their holders.

The cross-sectional illustration of FIG. 2 runs exactly through an axis of rotation 16 of the pinion 15, which can preferably be located in the centre of the cage 11 (in relation to the longitudinal extent). As FIG. 2 reveals, the disc-like pinion 15, illustrated very schematically, arranged with a rotational shaft 14 on the cage 11 is also located in the centre of the cage 11 in a direction transverse with respect to the longitudinal movement axis. The rotational shaft 14 forms the axis of rotation 16 of the pinion 15. This shaft is aligned at right angles to the longitudinal movement axis 3 and at right angles to outer contact surfaces 1a, 2a of the guide elements 1, 2, on which machine parts rest on the guide elements. As a result of this alignment of the pinion 15, the longitudinal movement axis runs through a circumferential surface of the pinion 15, on which a toothing system 15a is formed.

The pinion 15 is continuously engaged with toothing systems 17 (cf. FIG. 1) of toothed legs 18, 19 of each rack 8, 9. The toothing systems 17 are designed as rectilinear toothing systems on the free ends of two toothed legs 18, 19. The toothed legs 18, 19 are in turn provided as legs of one of the two racks 8, 9 in each case. The two toothed legs 18, 19 engage from different sides in a gap 20 (FIG. 2), which is formed between the two guide elements 1, 2. A fixing leg 21, 22, bent over at a right angle in relation to the toothed leg 18, 19 of each rack 8, 9, is in each case fitted to the outer side surface 6, 7 of the guide elements 1, 2. As FIG. 2 shows, the fixing leg 21 of the rack 8 of the movable guide element 1 is fitted to its right-hand outer side surface 6. The fixing leg 22 of the rack 9 of the fixed-position guide element 2 is, on the other hand, fixed to its left-hand outer side surface 7.

From this, it can be seen that both the two guide elements 1, 2 and the two racks 8, 9 can be configured identically in relation to the respective cross sections, which reduces the outlay on fabrication considerably. The two guide elements 1, 2 and the two racks 8, 9, respectively, can differ from one another only in terms of their length, which has no influence on the fabrication expenditure, but at most only a very low influence.

During a linear movement of the upper guide element 1, which can be produced by means of a drive to the machine part connected to the upper guide element 1, the guide element 1 with the rolling surfaces 4a, 4b moves on the balls 10. Here, the balls 10 are carried along by means of a frictional connection with the rolling surfaces 4a, 4b and rotate. The length of the longitudinal movement of the centre of each ball 10 is in this case half the length of the longitudinal movement of the upper guide element 1. The balls 10 in turn take the cage 11 along with them during their movement, the said cage moving linearly by the same length as the centres of the balls. By this means, the pinion 15 is also set rotating about the axis of rotation 16. At the same time, the pinion 15 engages in the toothing systems of the two racks 8, 9. Because of the operative connection between the pinion 15 and the two racks 8, 9, the cage 11 is guided positively and its position during a specific longitudinal movement of the guide element 1 is predetermined.

Figure 3:
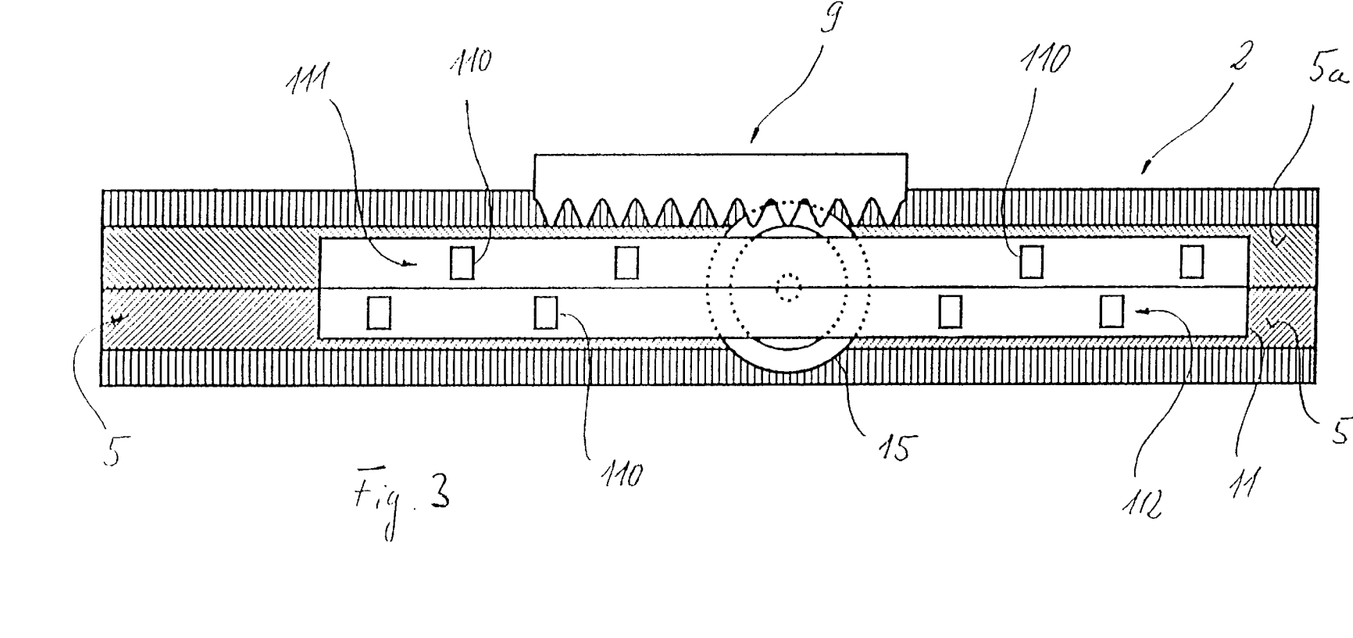
FIG. 3 shows a guide element with inserted cage belonging to a linear motion guide according to the invention and based on rollers.

A further exemplary embodiment according to the invention is shown in FIG. 3. For better clarity, of the two guide elements only the lower guide element 2 is shown, in whose groove the cage 11 is inserted. This cage 11, too, accommodates rolling elements and a pinion 15 in recesses. This exemplary embodiment differs from the exemplary embodiment shown in FIG. 1 substantially only in terms of other rolling elements and their arrangement. For this reason, only this difference will be discussed below. Firstly, in FIG. 3 rollers 110 are used instead of balls. Secondly, the rollers 110 are arranged in two rows 111, 112 running parallel to each other and parallel to the longitudinal movement axis. Rollers 110 of the same row 111, 112 are distinguished by the fact that in each of the two grooves 5 in the two guide elements, they rest on the same but only on one of the rolling surfaces 5a, 5b. Thus, in FIG. 3, rollers 110 of the row 111 rest on the rolling surface 5b, while the rollers 110 of the row 112 are supported on the rolling surface 5a. In the exemplary embodiment of FIG. 3, the rollers of the two rollers 111, 112 are arranged offset from one another in the longitudinal movement direction 3. Such an alternating arrangement of rolling elements in the longitudinal movement direction is also referred to as crossed-roller guidance.

Figure 4:
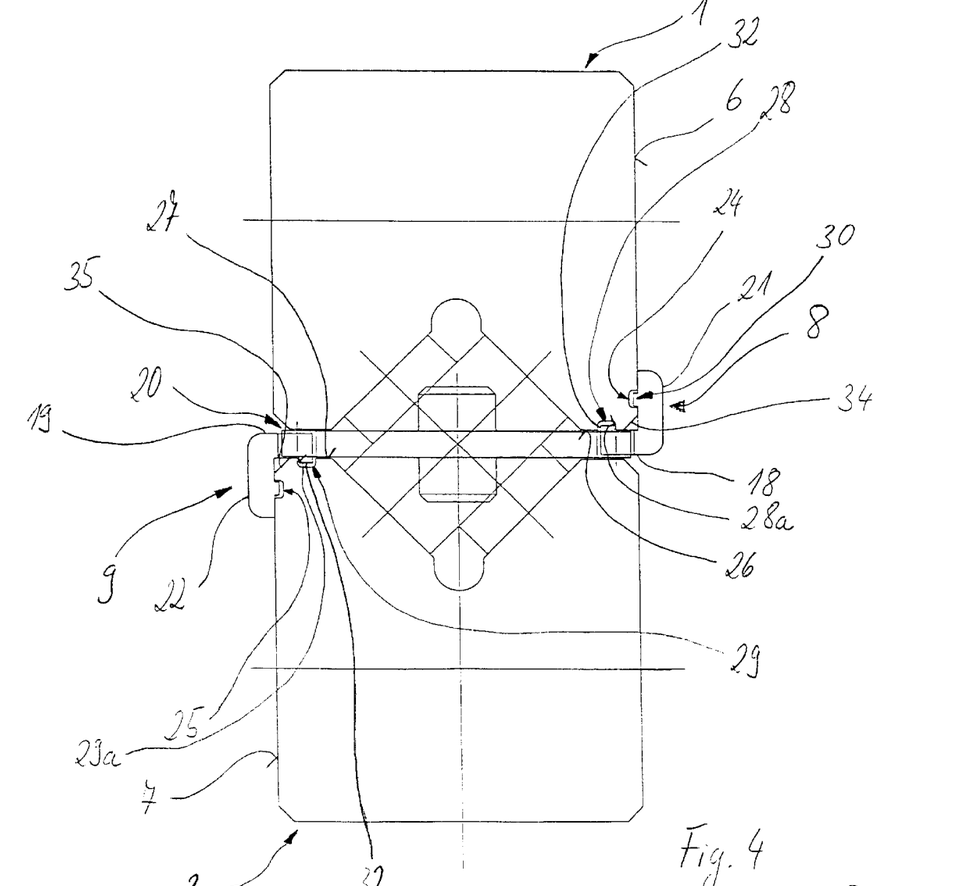
FIG. 4 shows a sectional illustration of a further exemplary embodiment according to the invention.

FIG. 4 shows preferred fixing of two positive guide means, in particular of a rack 8, 9, to the respective guide elements 1, 2. Such a rack 8 is shown in more detail in FIG. 5. As can be gathered from FIG. 4, on their outer side surfaces 6, 7, on which in each case a fastening leg 21, 22 of a rack 8, 9 comes to rest, the guide elements 1, 2 each have at least one groove-like recess 24, 25, whose longitudinal extent runs parallel to the longitudinal movement axis. Each guide element 1, 2 is further provided with a further groove 28, 29 running parallel to the longitudinal movement axis in each case on a further surface 26, 27, which is located in the gap 20 and opposite a toothed leg 18, 19.

Figure 5:
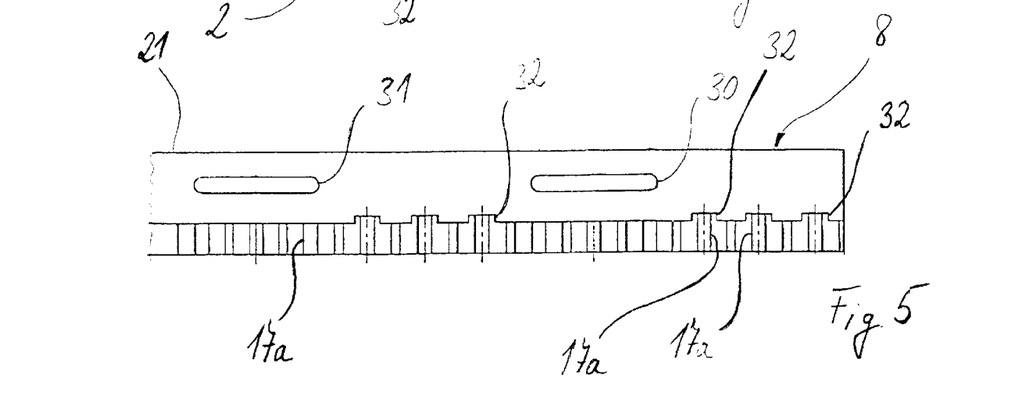
FIG. 5 shows a front view of a rack from FIG. 4.

Each rack 8, 9 of this embodiment can have, on their fixing legs 18, 19, at least two elongated webs 30, 31 which are aligned parallel to the longitudinal movement axis and which are provided to engage in one of the grooves 24, 25. The height of the webs 30, 31 should thus be slightly less than the depth of the grooves 24, 25. In addition, each toothed leg 18, 19 has, on a plurality of teeth 17a, projections 32 beyond the respective tooth width. Since the projections 32 are provided in order to engage in one of the grooves 28, 29, here, too, the height of the projections 30, 31 should be matched to the groove depth and, if necessary, to a distance between the respective toothed leg 18, 19 and the respective surface 26, 27.

In order to fix the racks 8, 9 of this embodiment, provision can be made to slide the racks 8, 9 along into the grooves 24, 25, 28, 29 from one end of a guide element 1, 2 with the webs 30, 31 and projections 32. The racks 1, 2, preferably consisting of plastic, can then be fixed by means of plates (not illustrated) screwed onto the guide elements 1, 2 at the ends and resting against the rack. For this purpose, the racks 8, 9 should be as long as the guide elements. In order that the racks 8, 9 are fixed without play, even in directions transverse with respect to the longitudinal movement axis, the webs 30, 31 and projections 32 should preferably rest against those groove surfaces 28a, 29a which are closest to the chamfered corners 34, 35 of the guide elements.

Provision can also be made to fix the second guide means, in particular the racks 8, 9, to the guide element without further fixing means, only by means of a form fit and/or force fit between the respective guide element 1, 2 and the guide means. For this purpose, for example, provision can be made to match the dimensions of the grooves 24, 25, 28, 29 to the dimensions of the webs 30, 31 and projections 32 in such a way that the webs 30, 31 and projections 32 each rest against the groove surfaces 28a, 29a lying closer to the corners 34, 35 with an adequately high clamping force. In order to mount one of the two preferably identical racks on the respective guide element, it may be necessary here to widen somewhat the angle formed by the two legs 18, 21; 19, 22 of the respective rack 8, 9. The restoring forces of the legs which are produced in this way can be used to produce a form fit in directions transverse to the longitudinal movement axis, and a force fit in a direction parallel to the longitudinal movement axis, by means of this snap-in connection between the guide element and the respective rack. In order to assemble a rack on a guide element, the rack can either be clipped on or pushed on at the end.

Figures 6, 7, 8:
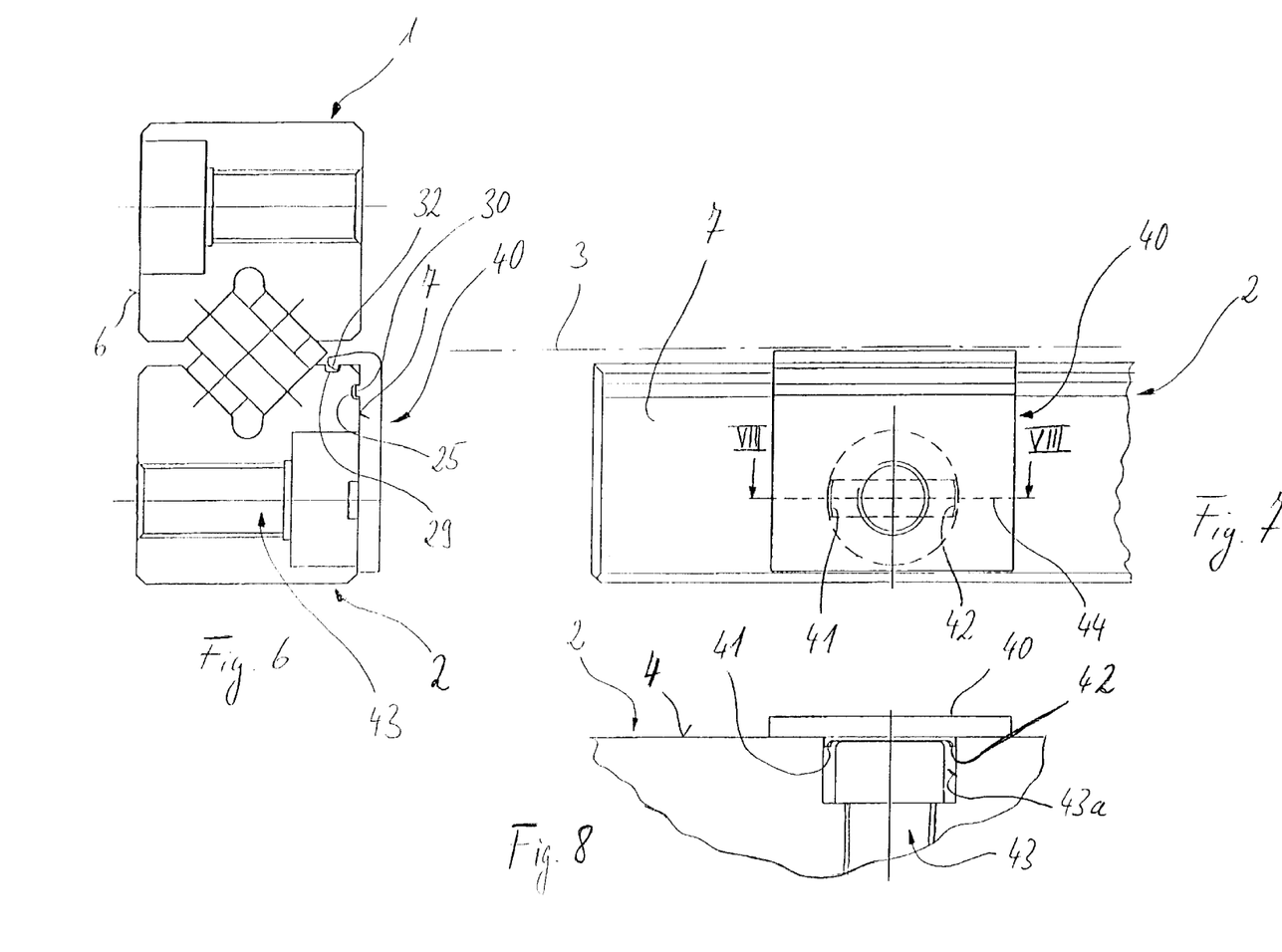
FIG. 6 shows an illustration of a cross section of the exemplary embodiment of FIG. 4 in the vicinity of one end of the guide elements.
FIG. 7 shows a side view of one of the guide elements from FIG. 6.
FIG. 8 shows an illustration according to the line VIII—VIII from FIG. 7.

In FIGS. 6, 7 and 8, one possible way of locking the second guide means (not reproduced in these illustrations) in the direction of the longitudinal movement axis 3 is shown. To this end, in each case a stop part 40 which is approximately rectangular in cross section and relatively short in the direction of the longitudinal movement axis 3 is fixed to one of the side surfaces 6, 7 of the guide element 1, 2, in the area of each end of the guide element 1, 2, and in the respective two grooves 25, 29. Any possible slight movement, which may be present, of the corresponding second guide means in the direction of the longitudinal movement axis 3 is limited by striking against the two stop parts 40 of each guide element.

On a section opposite the side surface 6, 7 of the respective guide element, each stop part 40 has two spring legs 41, 42, which engage in a horizontal hole 43 in the guide element 2. The spring legs 41, 42 are located substantially on a line 44 which runs parallel to the longitudinal movement axis 3. They rest against the wall 43 a of the hole, producing a spring force, and secure the stop part 40 against displacement in a direction parallel to the longitudinal movement axis 3. In addition, the stop part 40 also has a web 30 and a projection 32, which engage in the grooves 25, 29 in the guide element 2. By means of the clamping force also produced by this web 30 and projection 32, the stop part 40 is fixed in directions transverse to the longitudinal movement axis 3.

What is claimed is:

1. Linear motion guide for mounting and longitudinally guiding machine parts, in which a first guide element provided to be fixed to a machine part is guided by a plurality of rolling elements along a longitudinal movement axis with respect to a second guide element, likewise provided to be fixed to a machine part, for this purpose each guide element has a groove-like recess running parallel to the longitudinal movement axis, boundary surfaces of the recess in each guide element are provided as rolling surfaces for the rolling elements, the rolling elements are arranged one after another in one or more rows in at least one cage between the two guide elements, the cage is provided with at least one first positive guide means, the cage with its first positive guide means being guided by second positive guide means fixed to the guide elements, each second positive guide means being arranged only on one of the guide elements and being fixed in position relative to the latter, wherein the second positive guide means are fixed to the respective guide element outside the groove-like recesses on an outer surface of the respective guide element and project between the two guide elements in order to guide the first positive guide means and here are operatively connected to the first positive guide means in a form-fitting engagement.

2. Linear motion guide according to claim 1, wherein at least one of the guide elements has a substantially rectangular cross section, there being a V-groove as a recess in the area of one surface of the respective guide element.

3. Linear motion guide according to claim 1, wherein each of the second positive guide means is fitted to a side surface of a guide element.

4. Linear motion guide according to claim 3, wherein the side surface runs substantially parallel to the longitudinal movement axis.

5. Linear motion guide according to claim 1, wherein at least one of said guide means is fixed to one of the guide elements by means of a snap-in connection.

6. Linear motion guide according to claim 1, wherein second positive guide means of different guide elements are arranged on respectively different sides of the two guide elements.

7. Linear motion guide according to claim 1, wherein the second positive guide means each have an operative connecting part that is operatively connected to the first positive guide means, the operative connecting part having a longitudinal extent which runs parallel to the longitudinal movement axis.

8. Linear motion guide according to claim 7, wherein the operative connecting part of at least one of the second positive guide means is designed as a rack.

9. Linear motion guide according to claim 8, wherein the racks are each designed as an angled profile having a fixing leg and a toothed leg that is angled over with respect to the fixing leg, the fixing leg resting on a side surface of the guide element and the toothed leg projecting into a gap between the two guide elements.

10. Linear motion guide according to claim 8, wherein the length of the racks substantially corresponds to half the maximum displacement length along which the two guide elements can be displaced relative to each other.

11. Linear motion guide according to claim 8, wherein said first positive guide means is a pinion, is disposed on said cage and is operatively connected to the racks.

12. Linear motion guide according to claim 11, wherein the pinion has an axis of rotation which is aligned at right angles to the longitudinal movement axis and which intersects both guide elements.

13. Linear motion guide according to claim 11, wherein in relation to the longitudinal movement direction, the pinion is arranged approximately in the centre of the cage.

14. Linear motion guide for mounting and longitudinally guiding machine parts, in which a first guide element provided to be fixed to a machine part is guided by a plurality of rolling elements along a longitudinal movement axis with respect to a second guide element, likewise provided to be fixed to a machine part, for this purpose each guide element has a groove-like recess running parallel to the longitudinal movement axis, boundary surfaces of the recess in each guide element are provided as rolling surfaces for the rolling elements, the rolling elements are arranged one after another in one or more rows in at least one cage between the two guide elements, the cage is provided with at least one first positive guide means, the cage with its first positive guide means being guided by second positive guide means fixed to the guide elements, each second positive guide means being arranged only on one of the guide elements and being fixed in position relative to the latter; and wherein the second positive guide means are fixed to the respective guide element outside the groove-like recesses and project between the two guide elements in order to guide the first positive guide means and here are operatively connected to the first positive guide means of said means of a snap-in connection; and at least one of said guide means is fixed to one of the guide elements by a snap-in connection.

15. Linear motion guide according to claim 14, wherein at least one of the two second positive guide means is fixed to at least one outer surface of the guide elements.

16. Linear motion guide for mounting and longitudinally guiding machine parts, in which a first guide element provided to be fixed to a machine part is guided by a plurality of rolling elements along a longitudinal movement axis with respect to a second guide element, likewise provided to be fixed to a machine part, for this purpose each guide element has a groove-like recess running parallel to the longitudinal movement axis, boundary surfaces of the recess in each guide element are provided as rolling surfaces for the rolling elements, the rolling elements are arranged one after another in one or more rows in at least one cage between the two guide elements, the cage is provided with at least one first positive guide means, the cage with its first positive guide means being guided by second positive guide means fixed to the guide elements, each second positive guide means being arranged only on one of the guide elements and being fixed in position relative to the latter; and wherein the second positive guide means are fixed to the respective guide element outside the groove-like recesses and project between the two guide elements in order to guide the first positive guide means and here are operatively connected to the first positive guide means; the second positive guide means each have an operative connecting part that is operatively connected to the first positive guide means, with the operative connecting part having a longitudinal extent which runs parallel to the longitudinal movement axis; each operative connecting part is a rack; and the racks are each designed as an angled profile having a fixing leg and a toothed leg that is angled over with respect to the fixing leg, with the fixing leg resting on a side surface of the guide element, and the toothed leg projecting into a gap between the two guide elements.

* * * * *